United States Patent
Pedersen (10) Patent No.: US 7,347,668 B2
(45) Date of Patent: Mar. 25, 2008

(54) METHOD AND APPARATUS TO DETERMINE THE WIND SPEED AND DIRECTION EXPERIENCED BY A WIND TURBINE

(75) Inventor: Troels Friis Pedersen, Roskilde (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 11/527,327

(22) Filed: Sep. 25, 2006

(65) Prior Publication Data

US 2007/0086893 A1  Apr. 19, 2007

Related U.S. Application Data

(63) Continuation of application No. PCT/DK2005/000193, filed on Mar. 22, 2005.

(30) Foreign Application Priority Data

Mar. 26, 2004 (DK) ............................... 2004 00494

(51) Int. Cl.
*F03D 11/00* (2006.01)

(52) U.S. Cl. .................... 416/1; 416/146 R; 416/118

(58) Field of Classification Search ............... 416/1, 416/61, 146 R; 415/118; 73/170.11, 170.14, 73/170.07

See application file for complete search history.

(56) References Cited

U.S. PATENT DOCUMENTS

| 4,360,888 | A  | * | 11/1982 | Onksen et al. ............... 702/144 |
| 4,893,261 | A  | * | 1/1990  | Flint et al. ................... 702/144 |
| 5,874,673 | A  | * | 2/1999  | Greene ...................... 73/178 H |
| 6,938,472 | B2 | * | 9/2005  | Kaushik et al. ............... 73/187 |
| 2002/0047275 | A1 |   | 4/2002  | Wobben ...................... 290/55 |

FOREIGN PATENT DOCUMENTS

| EP | 1 288 494 A1 | 3/2003 |
| GB | 2 067 247 A  | 7/1981 |

* cited by examiner

*Primary Examiner*—Ninh H. Nguyen
(74) *Attorney, Agent, or Firm*—Winston & Strawn LLP (57) ABSTRACT

An apparatus and a method used to determine the speed and direction of the wind experienced by a wind turbine are provided. The apparatus comprises at least one sensor fixed to the rotor of the wind turbine, an angular sensor to measure the angular position of the rotor of the wind turbine, and a circuit which converts the relationship between the output of the at least one sensor and the output of the angular sensor into the speed and direction of the wind experienced by the wind turbine. According to the invention, the sensing apparatus can measure the wind speed and direction in three dimensions. In addition, mounting the sensors directly to the rotor of the wind turbine results in a very simple and robust installation. Mounting the sensors directly to the rotor also eliminates the turbulence from the rotor and the nacelle of the wind turbine from affecting the sensors.

15 Claims, 9 Drawing Sheets

METHOD AND APPARATUS TO DETERMINE THE WIND SPEED AND DIRECTION EXPERIENCED BY A WIND TURBINE

CROSS REFERENCE TO RELATED APPLICATIONS

This application is a continuation of International application PCT/DK2005/000193 filed Mar. 22, 2005, the entire content of which is expressly incorporated herein by reference thereto.

FIELD OF INVENTION

The present invention relates to an apparatus and a method used to determine the speed and direction of the wind experienced by a wind turbine.

BACKGROUND OF THE INVENTION

The power output of a wind turbine and the loads exerted on the wind turbine by the wind are to a large extent dependent on the orientation of the wind turbine with respect to the wind. Therefore means are available on most wind turbines to adjust the orientation of the wind turbine such that the optimum orientation can be achieved. In addition, means are available on most wind turbines which allow the wind turbine to be adjusted, by for example changing the angle of attack of the blades dependent on the wind speed.

In order for the wind turbine to be optimally adjusted, the wind speed and direction need to be known. By adjusting the wind turbine more optimally, the power output of the wind turbine will be increased and the loads on the wind turbine will be decreased.

In addition, accurate measurement of the wind speed and direction allows the power performance of the wind turbine to be determined accurately. Accurate power performance data for a wind turbine is very important for proper adjustment and monitoring of wind turbines.

DESCRIPTION OF THE PRIOR ART

In the prior art, the most common solution used to measure the speed and direction of the wind, is to place a cup anemometer and a wind vane on the roof of the wind turbine's nacelle. The problem with this approach is that the wind measurement is placed behind the rotor. The rotor introduces turbulence and therefore the wind measured by the wind sensor will be different from the wind in front of the rotor. In addition, if the wind is coming at an angle, either horizontally or vertically, the nacelle of the wind turbine introduces vortices and boundary layer effects which may heavily influence the wind sensors.

One solution for the purpose of power performance verification is to place a mast with a wind speed and direction sensor at a distance from the wind turbine. Typically, such a mast is placed at a distance 2-3 rotor diameters away from the wind turbine. This works well in areas where the wind is relatively the same at the location of the mast and the location of the wind turbine, flat on-land sites and offshore wind farms being good examples. However, in many locations this is not the case. One example is a wind turbine located on a mountainous site. In such situations the wind will be different at the wind sensor and at the wind turbine and it is therefore necessary to find the correlation between the two positions. This is very costly because another mast needs to be erected at the position of the wind turbine.

Another common option is to place a wind sensor on a shaft, which extends in front of the wind turbine coaxially with the axis of rotation of the rotor. This puts the wind sensor in front of the wind turbine, away from the turbulence caused by the rotor or the wind turbine body. However, since the rotor is spinning and the wind sensor needs to be kept stationary, a complex mechanical system needs to be built into the rotor in order to allow the rotor to spin about the stationary shaft holding the wind sensor.

Other more advanced sensor systems are also available which can directly measure the wind speed passing over each blade. One such system is described in U.S. Pat. No. 6,361,275. In this system, an anemometer is mounted on each blade. If the rotation speed of the rotor and the angle of attack of the blade are known, the actual wind speed present at the blade can be determined.

Another advanced sensor system is presented in GB patent application 2,067,247. The system provided by this invention is comprised of two pressure sensors located near the tip of the blade's profile. If the rotation speed of the rotor and the angle of attack of the blade are known, then the wind speed at the blade can be determined based on the pressure readings. In addition, this system describes a method of orienting the wind turbine until it is facing directly into the wind. This is accomplished by comparing the pressure readings when the rotor is at 90° and at 270°. If the pressures are equal, then the rotor is facing directly into the wind. If there is a difference, then the rotor position is adjusted until the difference is zero.

Another document, European Patent application 1,288,494, discloses a planar wind speed and direction sensor, which has two pitot tubes mounted in a plane at an angle to each other. This allows the sensor to determine the wind speed and direction in a single plane. European Patent application 1,288,494 also mentions that the sensor can be mounted to a rotor of a wind turbine and that the sinusoidal output of the pitot tubes can be used to orient the wind turbine. However, no details are provided of how the sinusoidal output is used to orient the wind turbine. It is assumed that a method is used which is similar to the one described in GB application 2,067,247.

However, the three systems described above do not provide a direct method of measuring the mean wind speed and direction experienced by the centre of the wind turbine's rotor. The rotor centre is typically used as a reference position for the wind speed of a power curve. In addition, two of the above three presented systems rely on sensors mounted in or on the blades. Sensors mounted in or on the blades are both difficult to install and to maintain due to their position. Sensors mounted on the blades also experience the problem that the air speed over the blade is to a large extent a function of the blade speed. Typically, the air speed due to the blade speed will be much higher than the air speed due to the wind.

Furthermore, the three systems described above do not give any information as to the flow inclination angle of the wind. The flow inclination angle is the angle the wind makes to the rotation axis of the wind turbine in a vertical plane. By knowing the flow inclination angle, the loads on the wind turbine can be determined more precisely.

SUMMARY OF THE PRESENT INVENTION

A first aspect of the current invention is to provide a wind speed and direction sensing apparatus for wind turbines which can be placed in front of the rotor and rigidly mounted to the rotor.

A second aspect of the current invention is to provide a wind speed and direction sensing apparatus and method for wind turbines which can measure the wind speed and direction in three dimensional space.

A third aspect of the current invention is to provide a wind speed and direction sensing method for wind turbines which can measure both wind speed and direction with a simple, robust and low cost apparatus.

A fourth aspect of the current invention is to provide a wind speed and direction sensing apparatus for wind turbines which can be made with no moving parts.

A fifth aspect of the current invention is to provide a wind speed and direction sensing method for wind turbines which in certain embodiments demands low computing power.

The new and unique way in which the current invention fulfills the above mentioned aspects is by presenting an apparatus as mentioned in the opening paragraph comprising at least one rotor sensor affixed to the rotor of the wind turbine, an angular sensor to measure the angular position of the rotor of the wind turbine, and a circuit which converts the relationship between the output of the at least one sensor and the output of the angular sensor into the speed and direction of the wind experienced by the wind turbine.

In this way, a sensing apparatus is provided which allows the sensors to be placed in front of the rotor, thereby preventing the air turbulence generated by the rotor and the nacelle from affecting the output of the sensors. In addition, the mounting of the sensors is very simple since the sensors are fixed directly to the rotor. This results in a sensing apparatus which is of low cost and low maintenance.

Depending on the type of sensor used, many possible embodiments of the sensing apparatus can be made which have no moving parts. In addition, certain types of sensors are especially well suited to harsh temperatures and weather. In this way, the sensing system can be made very robust.

Since the sensors rotate together with the rotor, the sensors scan the wind as it rotates and is therefore able to determine the wind speed and direction in three dimensional space.

In a preferred embodiment, the at least one sensor can be mounted on the spinner or the hub of the wind turbine or on a body fixed to the rotor of the wind turbine. In this way, if the characteristics of the airflow around the spinner or the body are known, these characteristics can be used to help determine the wind speed and direction.

One preferred choice for the sensor is an air speed sensor. Many different types of air speed sensors, such as sonic sensors, cup anemometers, etc . . . , are available which are robust and low cost. Another choice is a pressure sensor, the output of the pressure sensor representing the surface pressure at a point on the spinner or the body. The surface pressure is related to the speed of the air flowing over the surface and can therefore also be used to determine wind speed and direction.

In order to make the computing simpler, two sensors can be fixed to the rotor, the two sensors placed symmetrically about the rotation axis of the rotor and mounted on a plane encompassing the rotation axis. In this way, the system can, at any rotation angle of the rotor, find the angle that the wind makes to the rotation axis in that plane. By recording the output of the two sensors at two different angular positions, the two angular positions being 90° from each other, the wind direction can be specified in three dimensions.

Furthermore, by fixing three or more sensors to the rotor, the three or more sensors placed with equidistant angles around the rotation axis of the rotor, the wind speed and direction in three dimensions can be determined at any angular position of the rotor from a single recording at that position.

The current invention also provides for a method according to the opening paragraph comprising the steps of rotating at least one sensor about the rotation axis of the rotor of the wind turbine, recording the output of the at least one sensor in at least one angular position, and using the relationship between the at least one recording and the at least one angular position at which it was taken to calculate the wind speed and direction. In this way a method is provided which is simple and makes low demands on computing power.

There are many different sensing apparatuses which can be used in the above method. It should be understood that the current method is not limited to the apparatuses as described in this document. It should also be understood that the number of sensors and the number of angular positions at which recordings are taken can vary. For example, in the case where three sensors are spaced equidistantly on the surface of the spinner the wind speed and direction can be specified with one reading. In the case where only one sensor is mounted on the surface of the spinner, multiple recordings can be used to fully define the wind speed and direction in three dimensional space.

In certain cases, the at least one sensor can be mounted to a body fixed to the rotor of the wind turbine and the flow characteristics of the airflow around the body can be used in the calculation of the wind speed and direction. The body can for example be the spinner of the rotor. Using the flow characteristics of the airflow around such a body allows the sensors to be mounted quite close to the body since the non-linear effects of the airflow around the body are taken into consideration.

In another embodiment of the method, the output of the at least one sensor can be recorded at multiple points during the rotation of the rotor and the sinusoidal relationship between the recordings and the angular position at which the recordings were taken is used to determine the wind speed and direction. Using statistics the fluctuations in the wind speed and direction can be filtered out and the average wind speed and direction found.

In yet another embodiment of the method, the phase and the extreme values of the above described sinusoidal relationship can be used to determine the speed and direction of the wind.

Using the phase and extreme values of the sinusoidal relationship results in a simple method which requires low computing power.

It should be obvious to the person skilled in the art, that the above described embodiments are just a few of many apparatuses and methods which can be implemented within the scope of the current invention.

BRIEF DESCRIPTION OF THE FIGURES

The invention will be explained in greater detail below where further advantageous properties and example embodiments are described with reference to the drawings, in which.

DESCRIPTION OF A PREFERRED EMBODIMENT OF THE INVENTION

A first example embodiment 1 of an apparatus according to the invention is shown in FIGS. 1-4. In this example, two one-dimensional (1D) air speed sensors 2 are mounted on the spinner 3 of a wind turbine 4 in a plane which includes the rotation axis 5 of the spinner. As will be known to the person skilled in the art, the rotor 6 is typically comprised of two or more blades 7, which are joined together by the hub. A spinner 3 is attached to the centre of the rotor to streamline the flow around the hub. The hub is located inside the spinner and can therefore not be seen in FIGS. 1-4.

The front half of the spinner is spherical in order to ensure that the flow around the spinner is well described and smooth. The two 1D sensors 2 measure the component of the air velocity above the boundary layer of the spinner, in the plane in which the sensors lie and in a direction which is tangential to the surface of the spherical spinner at the point where the sensors are mounted.

In this example, one-dimensional sonic sensors are used. Each sonic sensor comprises two sensor heads 8a, 8b. The principle of operation of sonic sensors is to measure the time it takes for a sound wave to travel between the two sensor heads 8a,8b. A sound wave is being sent from the first sensor head 8a to the second sensor head 8b. The second sensor head 8b receives the sound wave, and a second sound wave is sent from the second sensor head 8b to the first sensor head 8a. The air speed, in the direction between the tips, can be determined by the difference in the time it takes for the two sound waves to travel the distance between the two sensor tips. These sensors have no moving parts and are therefore very robust. They can also be heated in order to prevent ice build-up in cold climates.

However, many other types of sensors can also be used in this application, not just 1D sonic sensors. Some examples (not shown) are pitot tubes, Savonious rotors, propeller anemometers, cup anemometers, etc. Some sensors, such as the 1D sonic sensors, automatically compensate for the rotation of the spinner, other sensors such as cup anemometers are affected by the spinner rotation as well. In these cases, it is possible to compensate for the spinner rotation by determining the rotation speed of the spinner from the measurement of the rotor's position over time.

Since the sensors are, in the current example, mounted directly to the spinner, they can be mounted such that they are accessible from inside the spinner. The spinner of many wind turbines is so large that a maintenance person can crawl into the spinner. The sensors can therefore be mounted from the inside of the spinner such that the body of the sensor is on the inside of the spinner and the sensing components protrude through one or more small holes in the surface of the spinner. In the example of a 1D sonic sensor, two small holes are drilled in the surface of the spinner through which the sonic probes protrude. The body of the sonic sensor with the signal conditioning and electronics is bolted to the inside of the spinner. Many other sensors can be mounted in this way, for example Savonious rotors, two bladed propellers, pitot tubes, etc . . .

Figure 5:
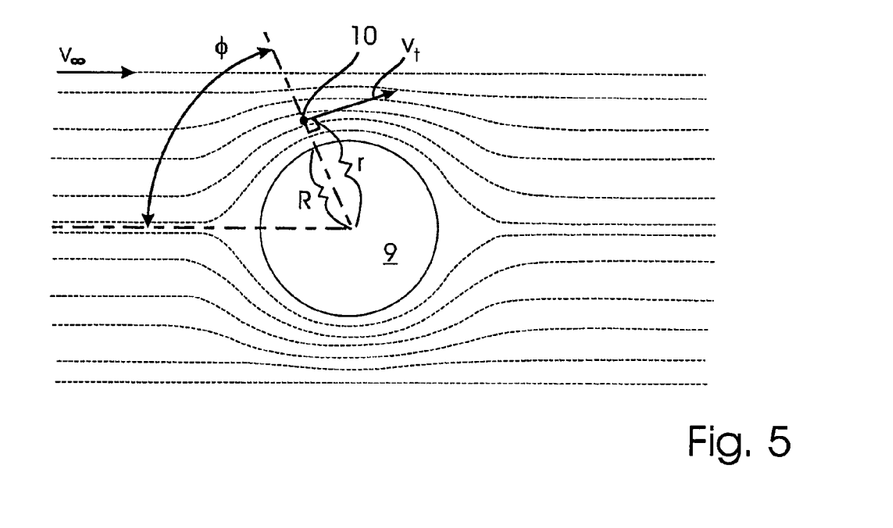
FIG. 5 shows theoretical streamlines of air flowing around a sphere.
Figure 6:
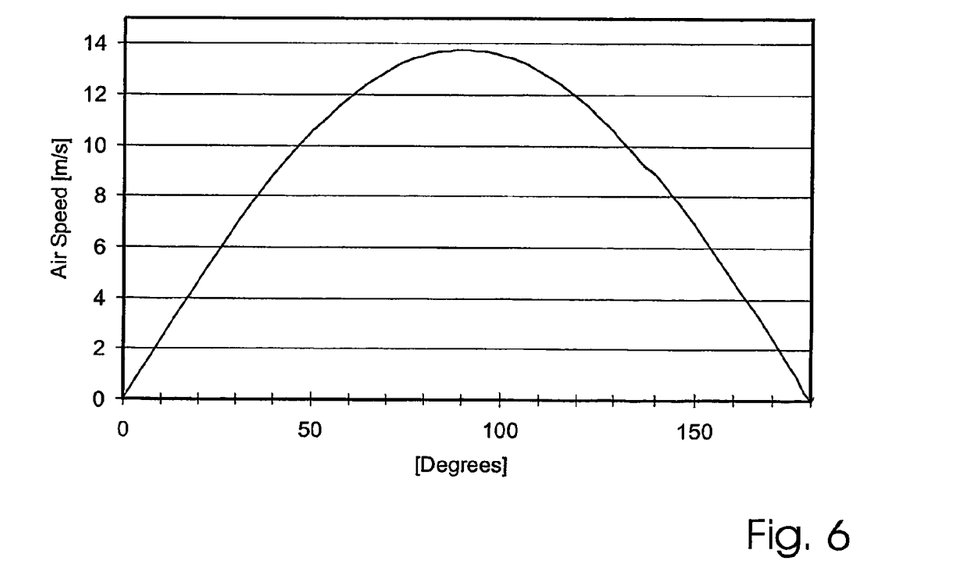
FIG. 6 shows theoretical tangential speed of the airflow around a sphere measured at different angles of φ as defined in FIG. 5.

In the current example, the wind speed and direction can be determined from the two 1D sensors by using knowledge of how the airflow speed is changed in two opposite directions around a spherical object combined with the knowledge of the position of the rotor relative to the horizon. FIG. 5 shows a schematic representation of theoretical flow around a spherical body 9. According to irrotational flow theory, the tangential airspeed of the airflow around a sphere at a certain point 10 can be written as:

$$v_t = v_\infty \sin(\phi)\left(1 + \frac{R^3}{2r^3}\right) \quad (1)$$

where $v_\infty$ is the velocity of the wind at a sufficient distance from the spinner such that it is not influenced by the spinner, φ is the angle formed between a vector from the centre of the sphere to the point of interest 10 and the wind direction vector, R is the radius of the sphere, and r is the distance from the centre of the sphere to the point of interest. FIG. 6 shows the tangential airspeed at different values of φ for a windspeed of 10 m/s and an r/R ratio of 1.1.

Figure 7:
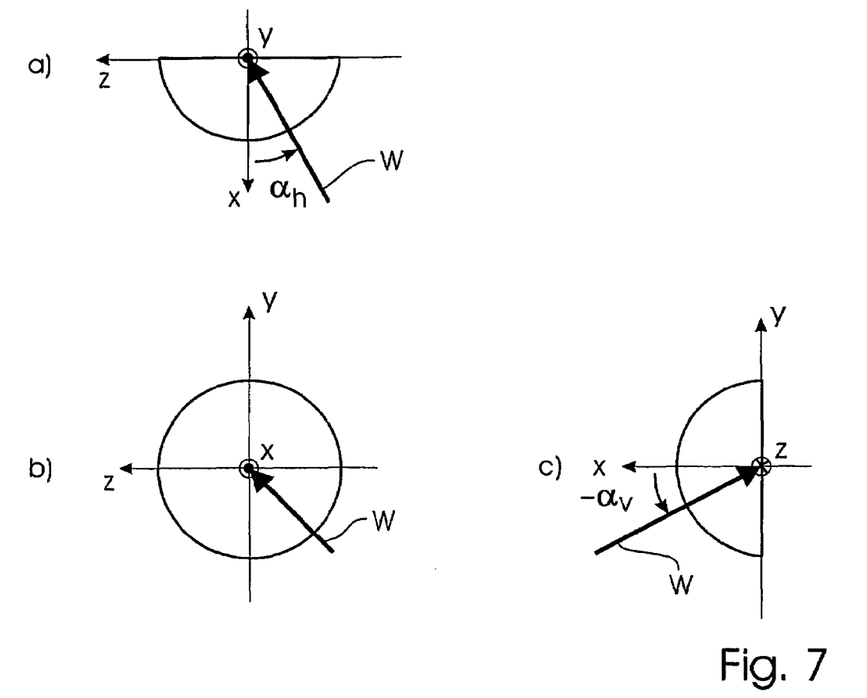
FIG. 7 shows the definition of the angles used to describe the wind direction in a first method according to the invention, where a) shows the spinner typically seen from above, b) shows the spinner typically seen from the front, and c) shows the spinner typically seen from the side.

In order to define the wind direction, two angles are used, $\alpha_h$ and $\alpha_v$, as shown in FIG. 7. The first angle $\alpha_h$, defines the angle of the projection of the wind vector W in the XZ plane. This plane is typically the horizontal plane. The angle is defined to be positive, counter clockwise about the y-axis. The second angle $\alpha_v$ defines the angle of the projection of the wind vector W in the XY plane. This plane is typically the vertical plane. Positive angles are defined as counter clockwise about the z-axis.

The first angle, $\alpha_h$, is found by using the ratio of the wind speeds measured by the two 1D sensors 2 when they lie in the XZ plane. The second angle $\alpha_v$ is found by using the ratio of the wind speeds measured by the two 1D sensors 2 when they lie in the XY plane. Using $\alpha_v$ as an example and the formula (1) for tangential wind speed as presented above we can calculate this ratio to be:

$$F(\alpha_v) = \frac{v_1(\theta - \alpha_v)}{v_2(\theta + \alpha_v)} \quad (2)$$

$$= \frac{v_\infty \sin(\theta - \alpha_v)\left(1 + \frac{R^3}{2r^3}\right)}{v_\infty \sin(\theta + \alpha_v)\left(1 + \frac{R^3}{2r^3}\right)}$$

$$= \frac{\sin(\theta - \alpha_v)}{\sin(\theta + \alpha_v)}$$

Figures 1, 2:
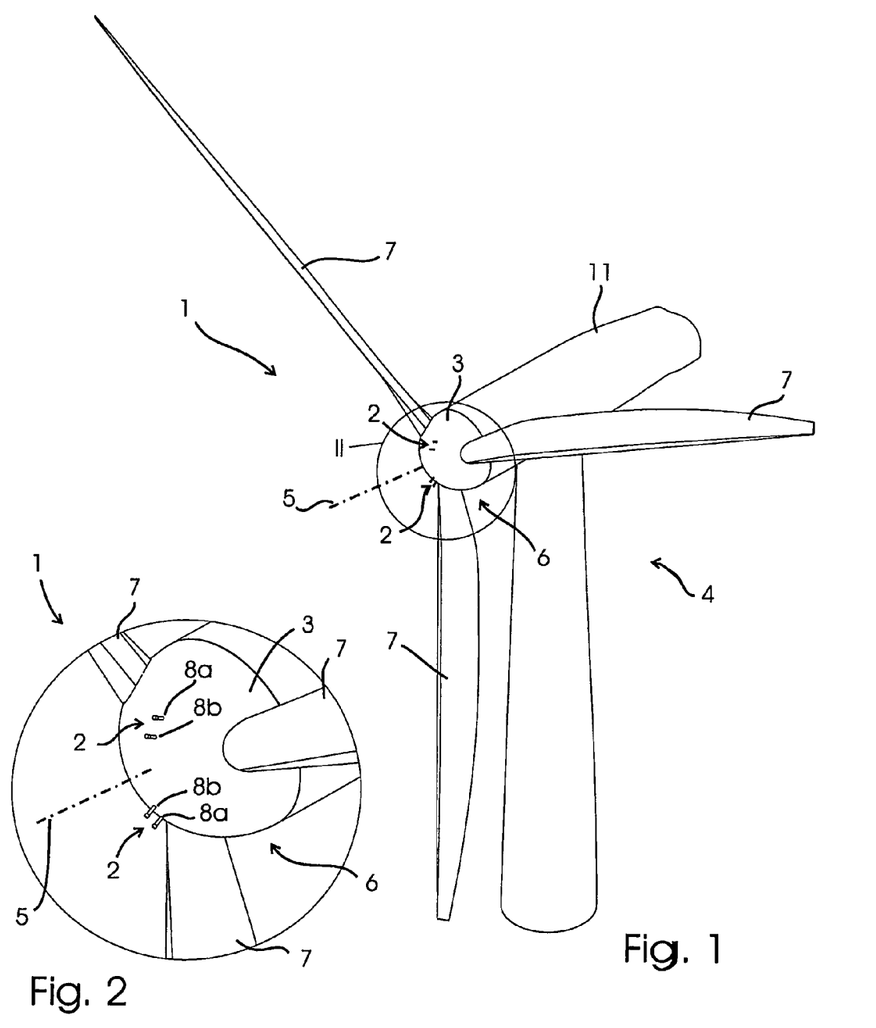
FIG. 1 is a schematic representation seen in perspective of a wind turbine equipped with a first embodiment of a sensing system according to the invention.
FIG. 2 shows a perspective detail view of the same.
Figure 3:
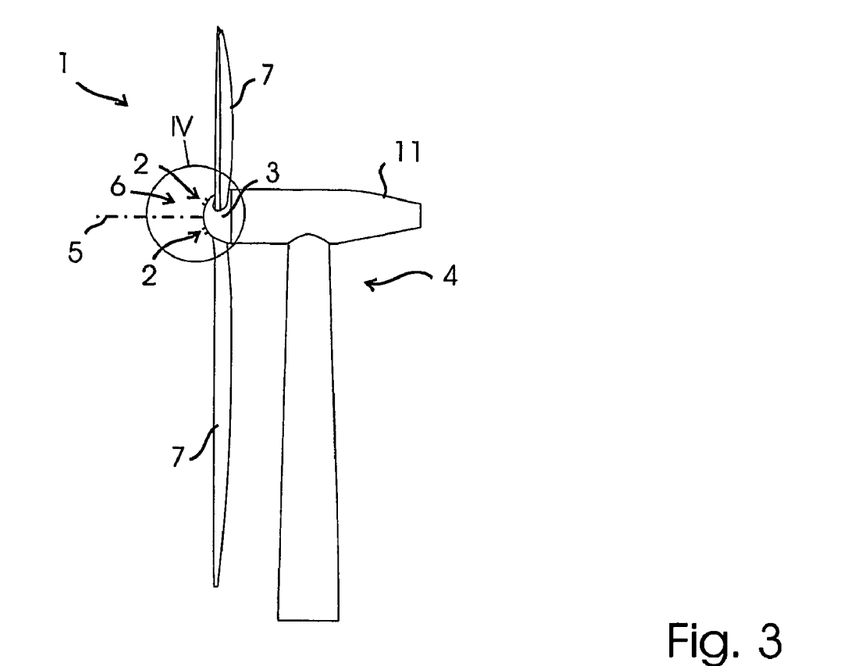
FIG. 3 shows a side view of the same.
Figure 4:
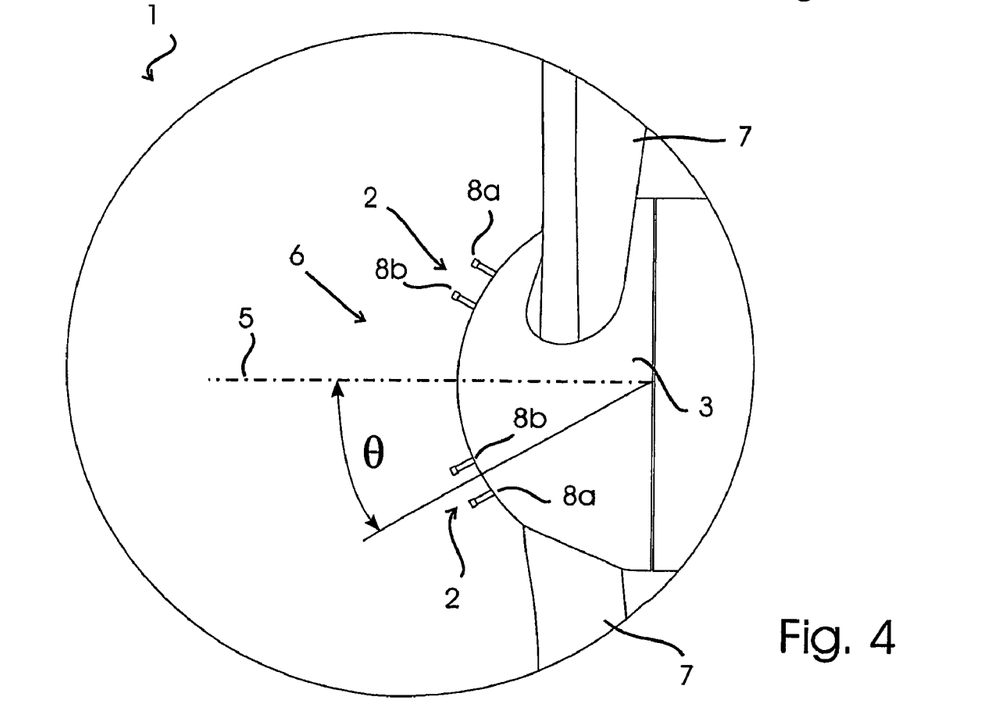
FIG. 4 shows a side detail view of the same.

The angle, $\theta$, is the angle at which the sensors are placed relative to the rotation axis 5 of the spinner 3, see FIG. 4. In the current example, $\theta$ is constant at 30°. As can be seen, the ratio F, as presented in equation (2) is only a function of $\alpha_v$ and not of wind speed. Therefore, by measuring this ratio and using the inverse of the above relationship, the angle $\alpha_v$ can be found.

Figure 8:
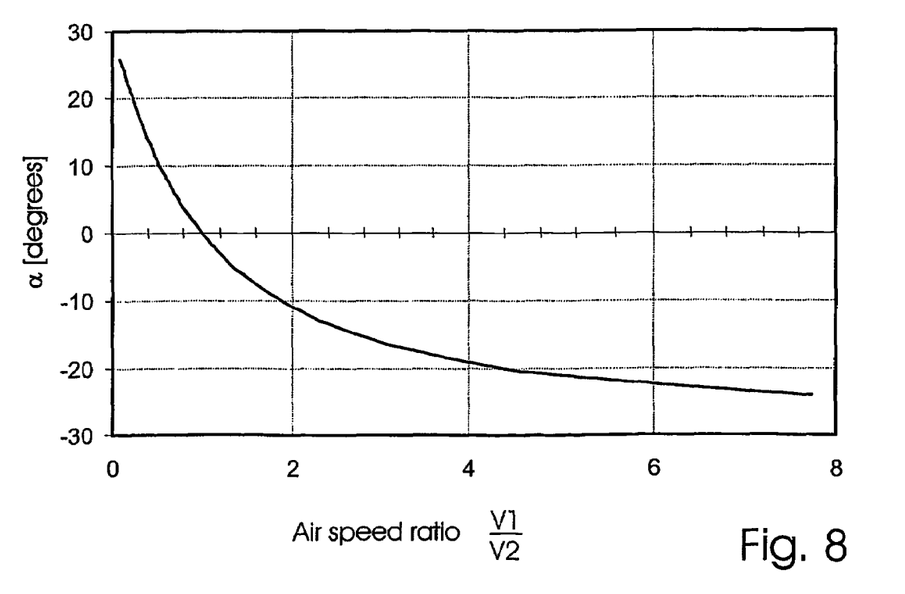
FIG. 8 shows the relationship between the angle of the wind and the airspeed ratio measured by air speed sensors mounted to opposite sides of the spinner of the wind turbine.

FIG. 8 shows the inverse of the above relationship. In this example, a closed form solution to the above relationship can also be found, see equation (3), however, for more complex spinner geometry, it might not be possible to find a closed form solution.

$$\alpha_v = \arctan\left(\frac{1 - F(\alpha_v)}{1 + F(\alpha_v)}\tan\theta\right) \quad (3)$$

The actual wind speed can be found by putting, for example, the first measured airspeed, $v_1$, and the calculated angle, $\alpha_v$, into formula (1) and solving for $v_\infty$. Equation (4) shows equation 1 solved for $v_\infty$.

$$v_\infty = \frac{v_1}{\sin(\theta - \alpha_v)\left(1 + \frac{1}{2}\left(\frac{R}{r}\right)^3\right)} \quad (4)$$

The calculations as presented above can be performed in some sort of electronic circuit. This circuit could for example be a micro-controller or a micro-processor (not shown). The circuit could in another embodiment be an analog circuit, which outputs analog signals which are proportional to the wind speed and direction. The circuit could either be placed in the spinner itself or in the nacelle 11. Signals can be transferred from the spinner to the nacelle via one of the many forms of data transmission known. In modern wind turbines, there are already many signals, which are transferred from the spinner to the nacelle.

In the example presented above, the outputs of the two air speed sensors are recorded in two angular positions. The first is when the air speed sensors lie in the horizontal plane and the second is when the air speed sensors lie in the vertical plane. The angular position of the air speed sensors can be detected in many different ways. One example is to use an angular sensor (not shown), which continuously measures the angular position of the rotor 6. Since the air speed sensors 2 are fixed to the rotor, the rotor's angular position and the air speed sensors' angular position are fixed relative to each other. The output of the air speed sensors can therefore be recorded when the angular sensor detects the desired angular position of the rotor. Multiple angular sensors can be used in certain cases to provide redundancy in the case that one or more of the angular sensors fail.

Another example (not shown) is to have some sort of trigger mounted to the rotor of the wind turbine which triggers measurements by the wind speed sensors each time the rotor reaches a certain position. This trigger could for example be a hall-effect sensor mounted on the rotor which gives a pulse each time the hall-effect sensor passes a magnet placed on the nacelle of the wind turbine. Four magnets could be embedded in the nacelle spaced 90° from each other. This system could also be described as a sort of angular sensor since it triggers at certain angular positions.

Figure 9:
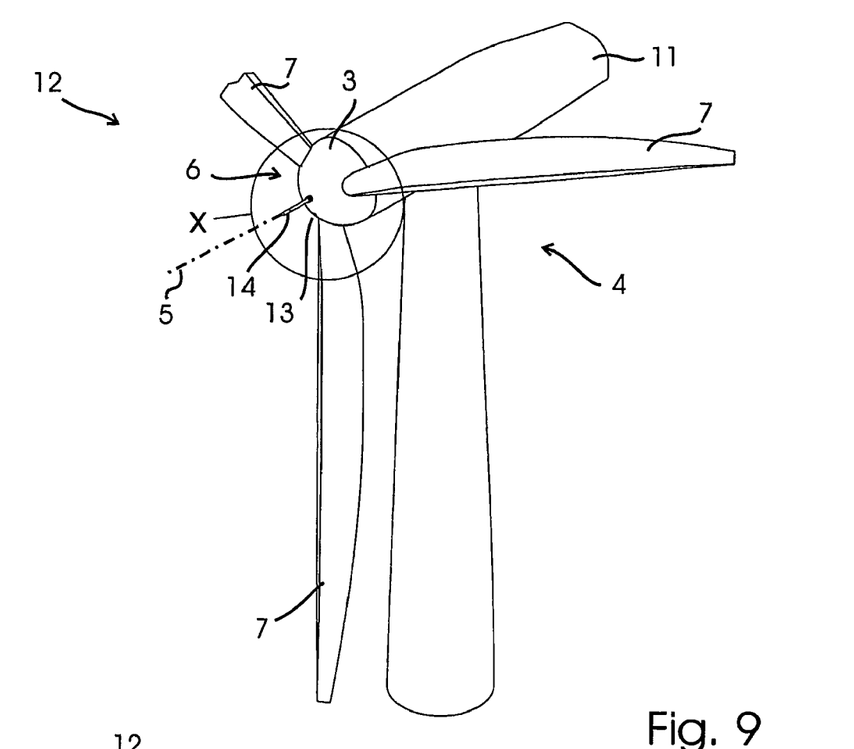
FIG. 9 shows a schematic representation seen in perspective of a wind turbine equipped with a second embodiment of the sensing system according to the invention.
Figure 10:
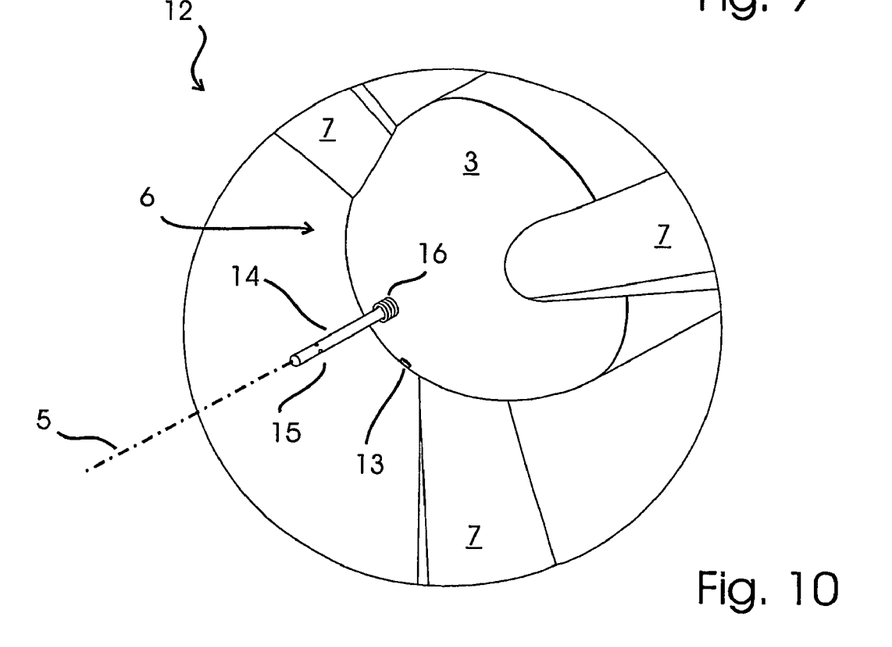
FIG. 10 shows a perspective detail view of the same.

FIGS. 9-10 show a second embodiment 12 of an apparatus according to the invention. In this embodiment, pressure readings from a pressure sensor 13 mounted to the surface of the spinner 3 of a wind turbine 4 are used to determine the wind speed and direction experienced by the wind turbine. In this embodiment, only one difference pressure sensor 13 is used, however, it will be obvious to the person skilled in the art that additional pressure sensors can be used to increase the performance of the system. As an example, increasing the sensor count will increase both the resolution and the bandwidth of the measurements.

Figure 11:
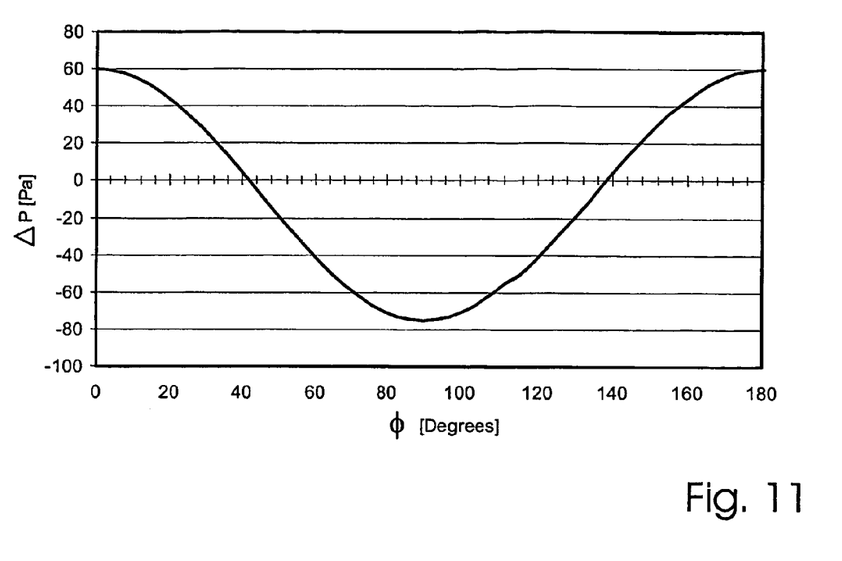
FIG. 11 shows theoretical pressure difference between the air pressure at different points on the surface of a sphere and the air pressure at a large distance from the sphere.

As in the previous example, the wind turbine shown in FIGS. 9-10 has a spinner with a spherical front surface. In order to find the pressure distribution we use theoretical pressure distribution of a fluid in the boundary layer around a sphere as given by irrotational flow theory. The pressure distribution is given by:

$$C_p = 1 - \frac{9}{4}\sin^2\phi \quad (5)$$

where $\phi$ is the angle between a vector describing the direction of the fluid in free stream and a vector between the centre of the sphere and the point of interest on the surface. This is the same angle as defined in FIG. 5. $C_p$ is the pressure coefficient and is defined as:

$$C_p = \frac{p - p_\infty}{\frac{1}{2}\rho v_\infty^2} \quad (6)$$

where $\rho$ is the density of the fluid, p is the pressure at the point of interest on the surface of the sphere, $p_\infty$ and $v_\infty$ are the pressure and airspeed respectively at a point located outside the influence of the spinner, for example on a rod 14 mounted in front of the spinner. The density of the fluid, $\rho$, can be determined from lookup tables if the pressure and temperature of the fluid are known. FIG. 11 shows theoretical pressure difference ($p-p_\infty$) as a function of $\phi$ at a wind speed of 10 m/s.

In the example embodiment as shown in FIGS. 9 and 10, a first pressure sensor 13 is mounted on the spherical surface of the spinner at an angle of 30° to the axis of rotation of the spinner. A second pressure sensor 15 is mounted on a rod 14 extending from the spinner on the axis of the rotor 5. The average pressure as measured through holes 15 in the rod gives the atmospheric pressure $p_\infty$ and the pressure difference to the pressure sensor on the spinner $p-p_\infty$. The rod also has a temperature sensor (not seen) at its base surrounded by rings 16 in order to shield it from the sun. As the spinner rotates, the pressure sensors 13,15 rotate with the spinner. This results in the first pressure sensor 13 "scanning" the pressure on the surface of the spinner. Depending on the angle between the wind and the rotation axis of the spinner, the pressure readings will change. In the special case where the wind direction and the rotation axis are the same, the pressure reading will be constant. However, as soon as the wind direction and the rotation axis of the spinner are slightly different, the output from the pressure sensor will in average have a sinusoidal shape. This sinusoidal relationship can be used to find the wind speed and direction.

It should be obvious to the reader that due to fluctuations in the wind, the actual output of the sensor 13 will not be perfectly sinusoidal. However, using statistical tools and/or taking a number of measurements over time, the output of the sensor can be fitted to a sinusoidal relationship. In addition, for spinners having different shapes, it could be imagined that the output of the sensor is not perfectly sinusoidal.

Figure 12:
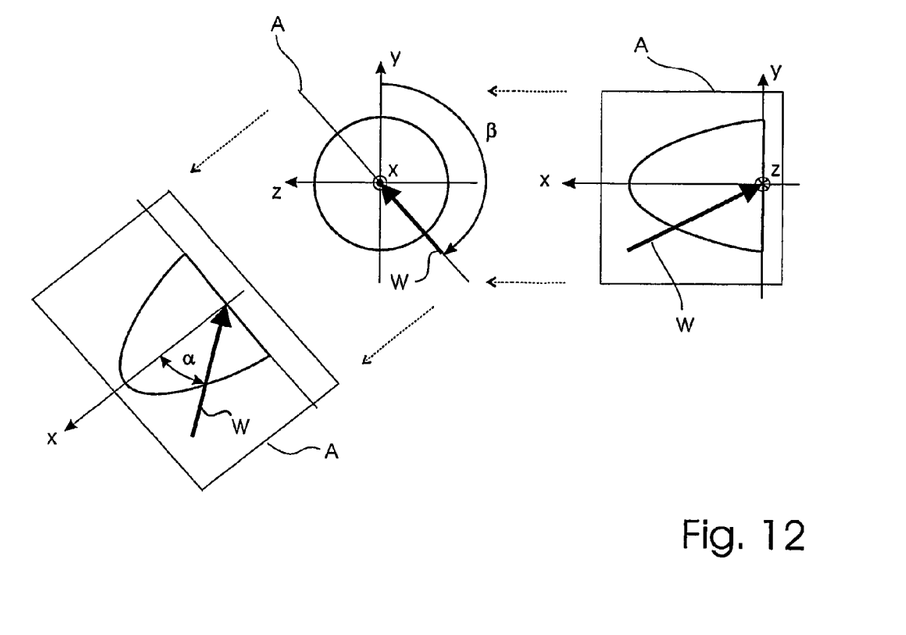
FIG. 12 shows the angles used to define the wind direction in a second method according to the invention.

In this second example, a different coordinate system can be used to define the wind direction. This coordinate system is shown in FIG. 12. The first angle, β, defines the angle of a plane A rotated about the rotation axis of the spinner. The plane A is the plane in which the wind direction vector lies. This plane rotates about the rotation axis of the spinner as the wind direction changes. The second angle α, defines the angle, in the plane A, between the wind direction vector and the rotation axis of the spinner.

The angle β can be found by finding the angle at which the maximum air pressure is measured by the pressure sensor. The maximum air pressure will be found when the sensor is lying in the same plane as the wind direction vector, that is to say on the plane A as described in FIG. 12. Therefore, the angle β can be easily found by measuring the angle of the spinner and recording the angle at which the maximum pressure occurs.

As in the previous example, the ratio between two sensor readings can be used to find α. In this example, the ratio between the minimum pressure reading and the maximum pressure reading is used. For the spinner in the current example, the minimum pressure reading occurs 180° from the maximum pressure reading. As in the previous example, two sensors could be mounted to the spinner 180° away from each other and the readings from both sensors recorded at a single position. However, in this example, only one sensor is used. Therefore, once the maximum pressure reading is taken, the sensor is rotated 180° further and the minimum pressure reading recorded at this second position. In order to take into account the fact that the wind speed and direction is, due to fluctuations in the wind, not the same at the time of the two pressure readings, the pressure readings should be taken over a number of rotations in order to average out the fluctuations in the wind.

Figure 13:
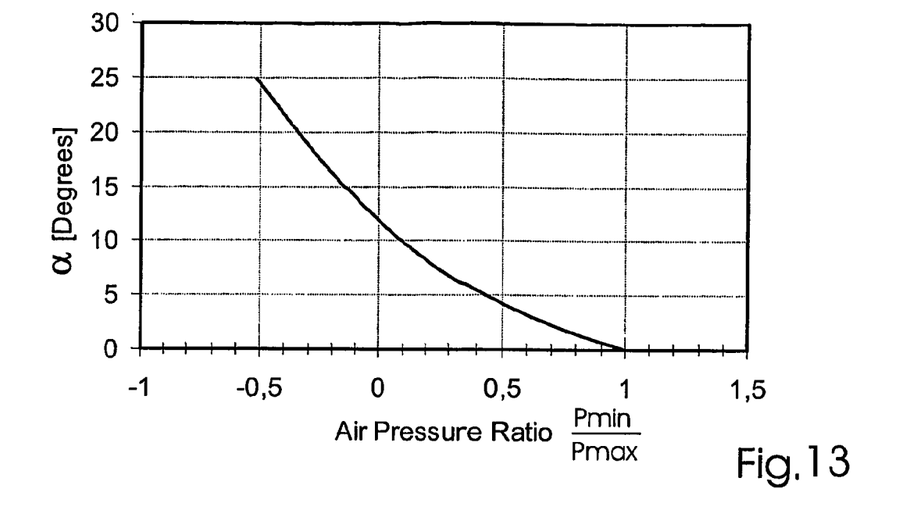
FIG. 13 shows the relationship between the angle of the wind and the air pressure difference ratio measured by pressure sensor readings taken on opposite sides of the spinner of the wind turbine.

By calculating the ratio, Pmin/Pmax, α can be determined. FIG. 13 shows the relationship between this ratio and α for theoretical pressure distribution used in this example and a pressure sensor located at 30°. This relationship needs to be determined theoretically or experimentally if a different spinner type is used or if a different pressure sensor location is used.

Once, α is known, it can be plugged into the pressure distribution formulas and used to solve for the wind speed. Equation (7) shows this relationship.

$$v_\infty = \sqrt{\frac{2(p_{\max} - p_\infty)}{\rho\left(1 - \frac{9}{4}\sin^2(\theta - \alpha)\right)}} \quad (7)$$

The procedure according to this second example could also be used with the sensors as presented in the first example.

If two or more sensors are used, the sensors can be calibrated using statistical tools. For example, consider that case where two sensors, S1 and S2, are mounted on a plane symmetrically about the rotation axis of the spinner. This is the same as in the first example. Due to this arrangement, for every half rotation, or 180°, the spinner makes, the two sensors, S1 and S2, swap places. This means that if the wind speed and direction were constant, the reading from S1 when the spinner is at 0° should be the same as the reading from S2 when the spinner is at 180°. If the two readings as described above were different, then the sensors could be calibrated such that the readings were the same. Using statistical tools, it is possible to use the readings from the sensors even though the wind speed and direction are not constant.

In the two examples presented above, the sensors were mounted directly to a spherical spinner. However, it is not necessary for the spinner to have a spherical shape. Other shapes such as ellipsoid, parabolic, etc . . . are also acceptable. For the method presented in this embodiment to work, the spinner needs to be shaped such that the airflow around the surface of the spinner can be relatively well defined and smooth.

Figures 14, 15:
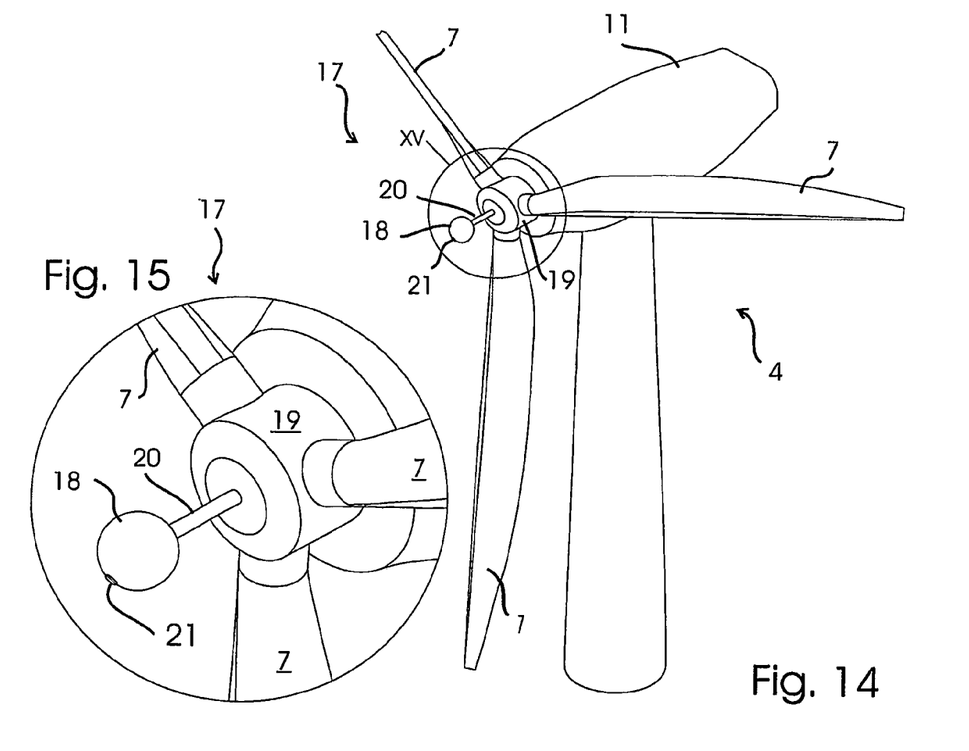
FIG. 14 shows a schematic perspective view of a wind turbine equipped with a third embodiment of the sensing apparatus according to the invention.
FIG. 15 shows a detail view of the same.

In cases where the flow distribution of the air around the spinner is not well defined or well known, or in cases where the spinner is of a non-smooth shape, a well-defined body can be rigidly mounted to the rotor. An example of this is shown in FIGS. 14-15 which show a third embodiment 17 of an apparatus according to the invention. In FIGS. 14-15 a spherical body 18 is attached directly to the rotor hub 19 via a shaft 20. One or more pressure sensors 21 or airspeed sensors can then be placed on this well-defined body and the distribution of the airflow over the well defined body used in determining the wind speed and direction.

For illustration purposes, the examples presented make use of theoretical airflow around a sphere. Theoretical airflow used in these examples was derived from irrotational flow theory. Since the airflow on spinners in the real world can be different from theory, an experimentally measured airflow could be used if more accuracy is required. A more accurate airflow could also be determined via more advanced theory or computational fluid dynamics (CFD) software, where also the minor influence of blade roots, the nacelle and the tower can be taken into account.

The presented examples made use of sensors placed at 30° to the rotation axis of the spinner. The angle at which the sensors are placed has an effect on the resolution of the sensing apparatus as well as the range of wind directions it can measure. Resolution is affected due to the non-linear nature of the airflow. Taking the case for a pressure based solution, it can be the that the highest resolution is achieved when the gradient of the pressure distribution is high. In the pressure distribution around a sphere, as shown in FIG. 11, the gradient is high at angles of around 45°. Therefore, in order to have the best resolution, the sensors should be placed at an angle which keeps the sensor at angles of φ close to 45°.

The range of wind directions measurable by the wind sensing apparatus also depends on the placement of the sensors. At angles of φ past approximately 80°, depending on the velocity and other characteristics of the wind, the flow can separate from the surface of the spinner, thereby making the sensor measurement unreliable. By placing the sensor at 30°, the wind can come in at angles of ±50° to the rotation axis of the spinner without the angle of φ going over 80°. Placing the sensor within the range of 30° to 50° is a good compromise, however, other angles are also possible.

Figure 16:
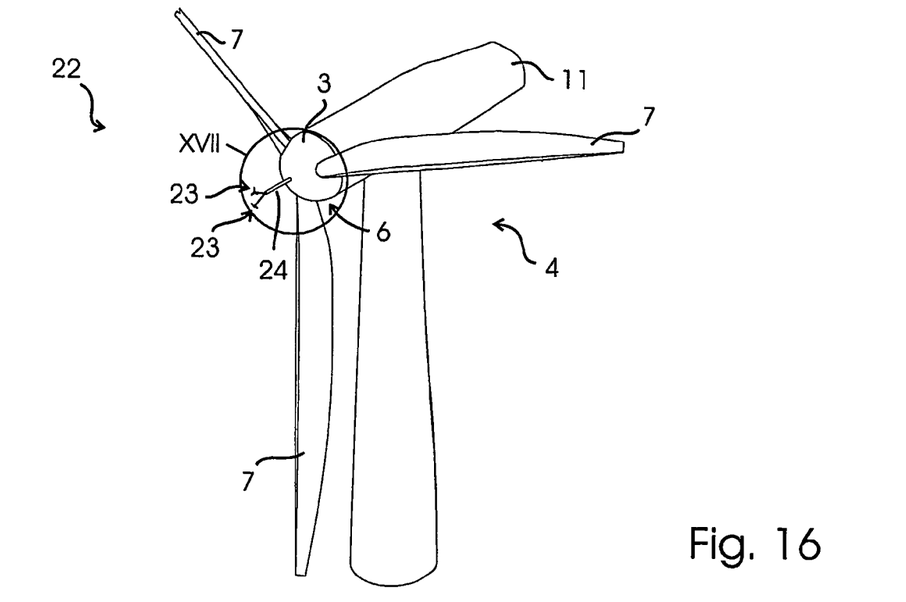
FIG. 16 shows a schematic perspective view of a wind turbine equipped with a fourth embodiment of the sensing apparatus according to the invention.
Figure 17:
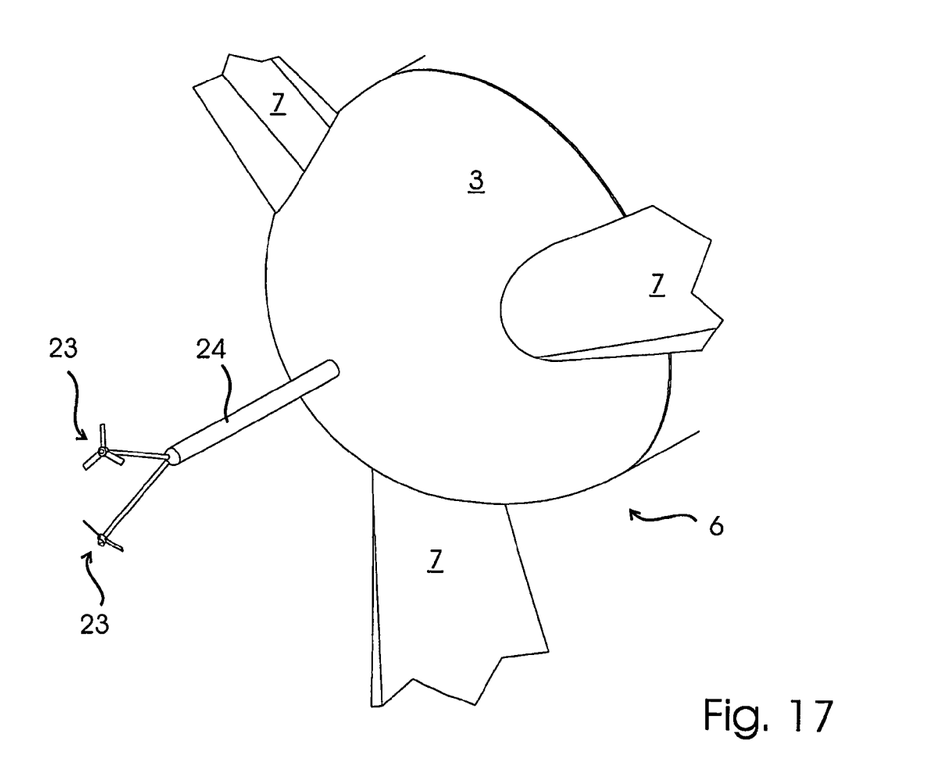
FIG. 17 shows a detail view of the same.

FIGS. 16 and 17 show a fourth embodiment 22 of an apparatus according to the invention. In this case, two propeller anemometers 23 are placed on a pole 24 rigidly connected to the front of the spinner 3. The two sensors are angled at 30° to the pole's axis. The pole places the sensors outside of the airflow which is affected by the shape of the spinner. As the spinner rotates, the pole and the propellers rotate with the spinner. The propeller anemometers will therefore output an almost sinusoidal signal as they rotate since the angle between the rotation axis of the sensor and the wind vector will change. The measurements from the propellers together with the measurement of the rotor position can be used to find the wind speed and direction. In this example, it is not important to know the characteristics of the pressure or velocity distribution of the airflow about the spinner because the sensors are exposed to the wind at a location where there are no significant effects from the spinner.

Instead of propeller anemometers, sonics or other types of wind speed sensors that change their output with a variation of the angle to the sensor can also be used together with the rotor position measurement.

In this fourth embodiment, the sensor is placed at an angle to the rotor axis in order to utilize the change in sensor output with the changes in inflow angle during rotation in order to determine the wind direction. This principle is similar to the principle described earlier, but with the difference that in this case the change in sensor output with the change in inflow angle during rotation is not due to the change in airspeed over the spinner, but rather it is due to the sensor changing orientation with respect to the wind.

Figure 18:
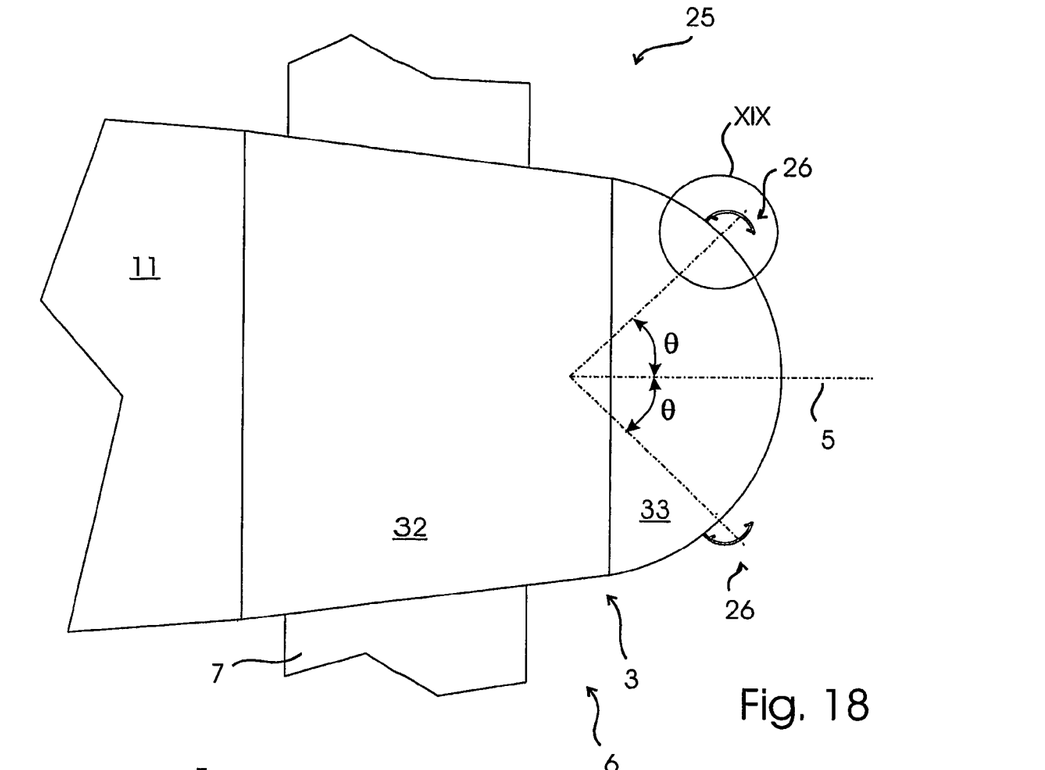
FIG. 18 shows a side view of a fifth embodiment of a sensing system according to the invention.
Figure 19:
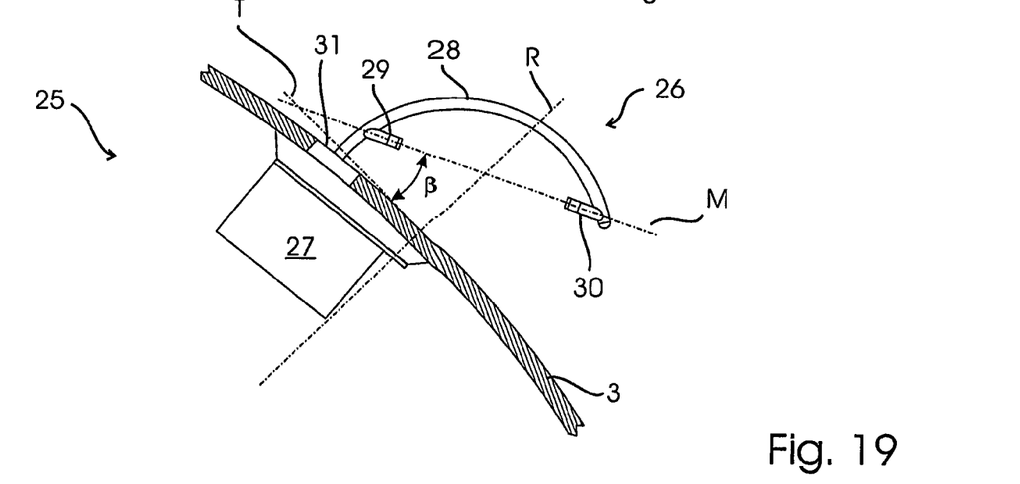
FIG. 19 shows a detail view of the same.

FIGS. 18 and 19 show a fifth embodiment 25 according to the invention. This embodiment has been developed due to experiments that showed that the output of the sensors can be made less susceptible to sensor mounting errors and ice build-up on the spinner by measuring the air speed over the spinner at an angle to the tangential airflow. In the embodiment shown in FIGS. 1-8, the sensors were arranged to measure the tangential airspeed of the airflow over the spinner. By simulating the effect of ice build-up on the spinner, it can be seen that ice build-up has a rather large effect on the tangential air speed measurement. However, by using the same simulation and measuring the airspeed at an angle to the tangent vector of the spinner at the sensor location, it can be seen that certain angles and certain sensor locations are less sensitive to the effects of ice build-up and mounting errors.

FIG. 18 shows two sensors 26 mounted to the spinner 3 at an angle of φ=±45° to the rotor's rotation axis 5. FIG. 19 shows a detailed view of one of the sensors 26. The sensors 26 are arranged to measure the air speed at an angle of β=26.3° to the tangential airflow flowing over the spinner at the location of the sensor. The tangent vector is shown in FIG. 19 with the letter T, the radial vector is shown with the letter R, and the measurement vector is shown with the letter M. The angles used in this example are used as an example only and should not limit the invention to these specific values.

The sensors 26 in this embodiment comprise a sensor body 27 which houses the electronics and signal processing means, a bent rod 28, and two sonic sensor heads 29, 30 attached to the bent rod 28. The bent rod 28 is arranged in such a way that the sonic sensor heads are placed on the vector M as shown in FIG. 19. The sensor body 27 is mounted to the inside of the spinner 3 and the bent rod 28 and sonic sensor heads 29,30 protrude through a hole 31 in the spinner 3. In this way, the sensor unit can easily be exchanged from the inside of the spinner, by detaching the sensor body 27 from the spinner and retracting the bent rod 28 and sonic sensor heads 29, 30 through the hole 31 in the spinner 3.

In this embodiment, the spinner 3 has been divided into two parts, a mounting part 32 and a sensor part 33. The mounting part 32 is rigidly connected to the rotor 6 of the wind turbine. The sensors 26 are attached to the sensor part 32. The sensor part 33 can be detached from the mounting part 32 and mounted in a wind tunnel for calibration and testing. When the sensor part 33 is calibrated it can be mounted back on the mounting part 32. This solution would be especially useful for smaller wind turbines where access to the inside of the spinner is not possible, since exchanging the sensor part would be quicker and easier than exchanging the individual sensors.

The arrangement of the sensor 26 as shown in FIG. 19 has the additional advantage that the upstream sonic sensor 30 does not disrupt the airflow through the sensor. This results in a more accurate reading of the airflow over the spinner surface.

As will be obvious to the reader, the method according to the current invention will not work if the wind is coming from behind the wind turbine. In this situation, a traditional wind vane will be useful to get the wind turbine oriented in the general wind direction. Once the wind turbine is facing relatively into the wind and the rotor has started rotating, the wind direction and speed determining apparatus according to the current invention can take over from the wind vane, and measure the wind direction and speed with much higher accuracy.

For all embodiments of the current invention the wind speed measured at the spinner or hub can be correlated to the free wind that is unaffected by the wind turbine rotor. This can be done with the use of a mast (not shown) positioned at a sufficient distance from the wind turbine, and with a wind speed sensor mounted at hub height. The correlation can be determined for the entire wind speed range, as well as for eventual different blade regulation control strategies.

In addition, as will be obvious to the person skilled in the art, the above examples are not exhaustive. There are many different ways of placing sensors on the rotor or the spinner of a wind turbine which make use of the techniques employed by the examples above. There are also many different mathematical methods to convert the measurements taken by sensors mounted on the rotor or the spinner of a wind turbine into the wind speed and direction.

What is claimed is:

1. An apparatus used to determine the speed and direction of the wind experienced by a wind turbine comprising:
   at least one rotor sensor to be affixed to a rotor of a wind turbine,
   an angular sensor to measure the angular position of the rotor of the wind turbine, and a circuit which converts the relationship between the output of the at least one rotor sensor and the output of the angular sensor into the speed and direction of the wind experienced by the wind turbine.

2. The apparatus according to claim 1 wherein the at least one rotor sensor is mounted on a spinner or hub of the wind turbine.

3. The apparatus according to claim 1 wherein the at least one rotor sensor is mounted on a body affixed to the rotor of the wind turbine.

4. The apparatus according to claim 1, wherein the at least one rotor sensor is an air speed sensor.

5. The apparatus according to claim 1, wherein the at least one rotor sensor is a pressure sensor, with the output of the pressure sensor representing surface pressure at a point on the wind turbine.

6. The apparatus according to claim 1, wherein the rotor has a rotation axis and two rotor sensors are affixed to the rotor, placed symmetrically about the rotation axis and mounted on a plane encompassing the rotation axis.

7. The apparatus according to claim 1, wherein the rotor has a rotation axis and at least three rotor sensors are affixed to the rotor and placed at equidistant angles around the rotation axis of the rotor.

8. A method for determining the speed and direction of wind experienced by a wind turbine which comprises:
   providing the apparatus according to claim 1;
   affixing the at least one rotor sensor to a rotor of a wind turbine; and
   utilizing the circuit for the purpose of determining the speed and direction of wind experienced by the wind turbine.

9. An apparatus used to determine the speed and direction of the wind experienced by a wind turbine comprising:
   at least one rotor sensor to be affixed to a rotor of a wind turbine,
   an angular sensor to measure the angular position of the rotor of the wind turbine, and
   a circuit which converts the relationship between the output of the at least one rotor sensor and the output of the angular sensor into the speed and direction of the wind experienced by the wind turbine,
   wherein the at least one rotor sensor comprises a rod mounted on the wind turbine, two sonic sensor heads attached to the bent rod opposite each other, and a sensor body with the circuit which converts the relationship between the output of the at least one rotor sensor and the output of the angular sensor into the speed and direction of the wind experienced by the wind turbine.

10. A method for determining the speed and direction of wind experienced by a wind turbine which comprises:
    rotating at least one rotor sensor about a rotation axis of the rotor of a wind turbine,
    recording the output of the at least one rotor sensor in at least one angular position, and
    using the relationship between the at least one recording and the at least one angular position at which it was taken to calculate the wind speed and direction.

11. The method according to claim 10, wherein the at least one rotor sensor is mounted a body affixed to the rotor of the wind turbine and the flow characteristics of the airflow around the body are used to help to determine the wind speed and direction.

12. The method according to claim 10, wherein the output of the at least one rotor sensor is recorded at multiple points during the rotation of the rotor and the relationship between the recordings and the angular position at which the recordings are taken is used to determine the wind speed and direction.

13. The method according to claim 12, wherein phase and extreme values of the relationship are used to determine the speed and direction of the wind.

14. The method according to claim 10, wherein the at least one rotor sensor is at least one air speed sensor affixed to the rotor of the wind turbine.

15. The method according to claim 10, wherein the at least one rotor sensor is at least one pressure sensor mounted to a rotating body affixed to the rotor of the wind turbine.

* * * * *

UNITED STATES PATENT AND TRADEMARK OFFICE
CERTIFICATE OF CORRECTION

PATENT NO.        : 7,347,668 B2
APPLICATION NO. : 11/527327
DATED             : March 25, 2008
INVENTOR(S)       : Pedersen Page 1 of 1

It is certified that error appears in the above-identified patent and that said Letters Patent is hereby corrected as shown below:

<u>Column 9</u>:
Line 19 (claim 10, line 9), after "taken to calculate the wind speed and direction" insert -- of the wind experienced by the wind turbine --.

Signed and Sealed this

Seventeenth Day of June, 2008

JON W. DUDAS
*Director of the United States Patent and Trademark Office*